(12) United States Patent
Dahlgrün et al.

(10) Patent No.: US 6,247,577 B1
(45) Date of Patent: Jun. 19, 2001

(54) APPARATUS FOR CHANGING THE DIRECTION OF TRANSPORT OF OVAL CIGARETTES

(75) Inventors: Rolf Dahlgrün, Chaville; Rolf Schmidt, Linas, both of (FR)

(73) Assignee: Decouflé s.a.r.l., Chilly-Mazarin Cedex (FR)

( * ) Notice: Subject to any disclaimer, the term of this patent is extended or adjusted under 35 U.S.C. 154(b) by 0 days.

(21) Appl. No.: 09/417,315

(22) Filed: Oct. 13, 1999

(30) Foreign Application Priority Data

Oct. 13, 1998 (DE) ............................. 198 47 152

(51) Int. Cl.⁷ ................................. B65G 47/24
(52) U.S. Cl. ............................. 198/417; 193/46
(58) Field of Search ................. 198/417, 471.1, 198/475.1, 476.1; 193/46

(56) References Cited

U.S. PATENT DOCUMENTS

| 1,576,338 | * | 3/1926 | Ladd ........................... 198/417 |
| 2,917,156 | | 12/1959 | Pollmann . |
| 3,974,007 | | 8/1976 | Greve . |
| 4,042,112 | * | 8/1977 | Molins et al. ............... 198/417 |
| 4,051,947 | | 10/1977 | Schumacher et al. . |
| 4,901,860 | | 2/1990 | Wahle et al. . |
| 4,915,547 | * | 4/1990 | Cahill et al. ............... 198/417 |
| 5,632,285 | | 5/1997 | Dahlgrün . |
| 6,006,891 | * | 12/1999 | Iwano et al. ............... 198/417 |

FOREIGN PATENT DOCUMENTS

| 298 865 | 8/1954 | (CH) . |
| 1 049 283 | 1/1959 | (DE) . |
| 1 253 617 | 11/1971 | (GB) . |

* cited by examiner

Primary Examiner—Joseph E. Valenza
(74) Attorney, Agent, or Firm—Venable; Robert Kinberg

(57) ABSTRACT

Plain oval cigarettes which issue from a maker in such orientation that the minor axes of their oval cross-sectional outlines extend vertically are advanced lengthwise in the spiral groove of a trough toward an outlet where the major axes of their oval cross-sectional outlines extend vertically. The thus reoriented oval cigarettes are attracted to the undersides of receptacles which are pivotably mounted on a rotary carrier and deliver the cigarettes, without any further changes in the orientation of the major and minor axes of their cross-sectional outlines, to successive peripheral flutes of a rotary drum-shaped conveyor which transports the cigarettes in such a way that the minor axes of their oval cross-sectional outlines extend radially of the rotational axis of the drum-shaped conveyor. This ensures that the oval cigarettes are more reliably held in their flutes during advancement with the drum-shaped conveyor.

19 Claims, 1 Drawing Sheet

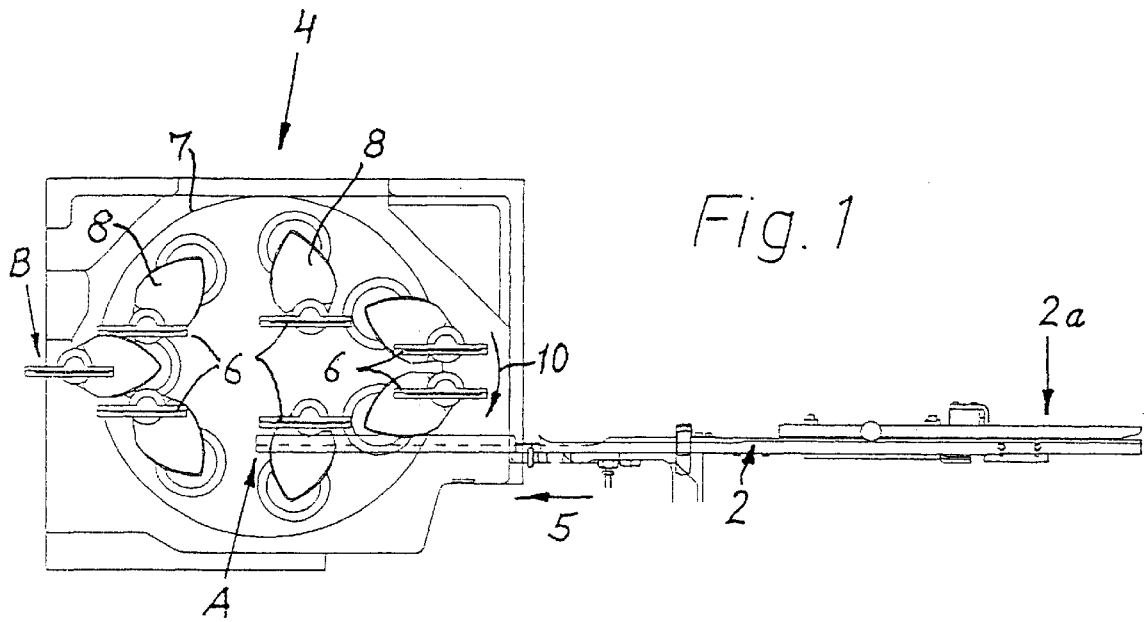
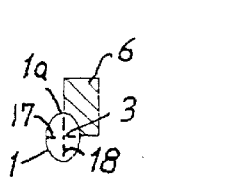
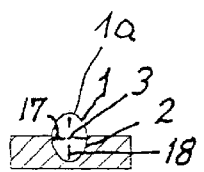
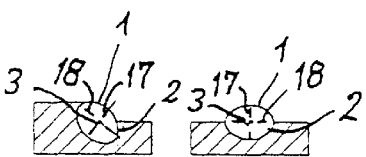
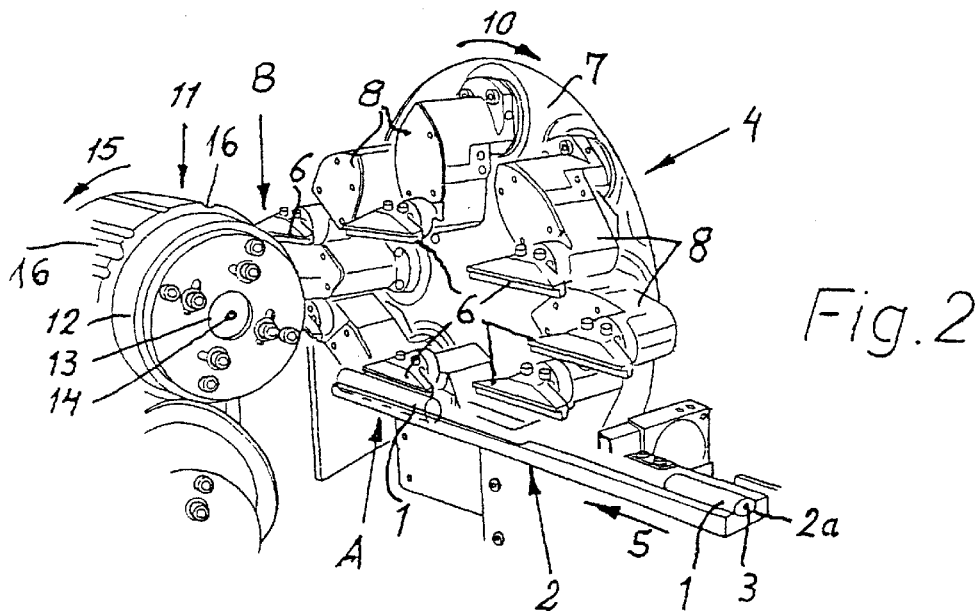

APPARATUS FOR CHANGING THE DIRECTION OF TRANSPORT OF OVAL CIGARETTES

CROSS-REFERENCE TO RELATED CASES

This application claims the priority of German patent application Serial No. 198 47 152.1 filed Oct. 13, 1998. The disclosure of the German patent application, as well as that of each US and foreign patent and patent application mentioned in the specification of the present application, is incorporated herein by reference.

BACKGROUND OF THE INVENTION

The present invention relates to improvements in methods of and in apparatus for manipulating elongated rod-shaped commodities, and more particularly to improvements in methods of and apparatus for changing the direction of transport of elongated rod-shaped commodities or articles, especially cigarettes, filter rod sections and other types of smokers' products having a cross-sectional outline departing from a circular or truly circular outline. Typical examples of commodities which can be manipulated in accordance with the method and in the apparatus of the present invention are plain or filter cigarettes having an elliptical or oval cross-sectional outline with a major axis and a minor axis normal to the major axis.

It is often necessary to transfer elongated rod-shaped articles of the tobacco processing industry between a first path, wherein the articles form a file of successive coaxial or substantially coaxial articles, and a second path wherein the articles are intended or compelled to move sideways, i.e., at least substantially at right angles to their longitudinal axes. For example, it is often necessary or desirable to introduce successive cigarettes of a file of oval cigarettes into the first path in such a way that the minor axes of their elliptical outlines extend at least substantially vertically. An advantage of such advancement of cigarettes having elliptical cross-sectional outlines (hereinafter called oval cigarettes for short) is that a substantial portion (namely about one-half) of the external surface of the tubular wrapper of the oval cigarette is available for engagement by the holders of a delivering device which lifts successive cigarettes out of the first path and advances them to a receiving portion of a second path wherein the cigarettes are compelled to move sideways, i.e., at least substantially at right angles to their respective longitudinal axes. The means for moving the cigarettes in the second path at right angles to their respective longitudinal axes normally comprises a substantially cylindrical or drum-shaped conveyor having axially parallel cigarette-receiving and attracting receptacles in the form of flutes which are or can be parallel to the axis of the conveyor and to the longitudinal axes of the cigarettes arriving at the cigarette-receiving or accepting portion of the second path.

As used herein, the term "lengthwise transport" denotes an advancement of a file of successive oval cigarettes in the direction of their longitudinal axes. On the other hand, the expression "sideways conveying, advancement or transport" is intended to identify a movement at least substantially at right angles to the direction of movement of an oval cigarette along the first path.

The first path can receive successive discrete cigarettes or successive pairs or sets of two or more cigarettes which are obtained as a result of repeated severing of a continuous cigarette rod which is formed by draping a continuous web or strip of cigarette paper or other suitable wrapping material around a continuous tobacco- and/or filter material-containing filler. The cutter is an orbiting knife which severs the continuous cigarette rod by repeatedly severing the leader of the cigarette rod, and the discrete cigarettes of the thus obtained file of oval cigarettes are often introduced into an at least substantially horizontal channel which delivers the cigarettes to a first transfer station where the holders of the aforementioned delivering device accept successive cigarettes or groups of coaxial cigarettes for transport to a second transfer station where the cigarettes begin to move exclusively sideways, i.e., at right angles to their respective longitudinal axes, for example, into a cigarette packing machine.

The aforementioned delivering device can be designed to operate in a manner substantially as disclosed, for example, in U.S. Pat. No. 4,051,947 granted Oct. 4, 1977 to Schumacher et al. for "TRANSFER APPARATUS FOR CIGARETTES OR THE LIKE". The holders of the delivering device in the patented apparatus attract individual cigarettes or pairs of coaxial cigarettes by suction. For example, the first path can be defined by a channeled guide of the type disclosed in UK patent No. 1 253 617.

The delivering device in the apparatus disclosed in the '947 patent to Schumacher et al. does not change the orientation or angular positions of the cigarettes which are being delivered from the discharge end of the first path into the receiving end of the second path. Thus, if the minor axis of an oval cigarette arriving at the discharge end of the first path is vertical, such axis remains vertical during delivery toward as well as during transfer into a peripheral flute of a rotary conveyor defining the second path (for sidewise movement of oval cigarettes, e.g., to a so-called filter tipping machine wherein plain cigarettes are united with filter rod sections or mouthpieces of unit length or multiple unit length, or to a packing machine).

The delivering device of the type disclosed in the '947 patent to Schumacher et al. advances discrete cigarettes or groups of several coaxial cigarettes along a portion of an endless path to a position (namely to the receiving station or portion of the second path) when the extent of axial movement of the cigarettes has been reduced to zero so that the thus arrested successive cigarettes or groups of cigarettes can enter successive axially parallel peripheral flutes of the endless rotary conveyor which defines the second path.

If the channeled guide which defines the first path is designed to accept and advance a file of oval cigarettes, the groove is configurated in such a way that the minor axis of the elliptical cross-sectional outline of the cigarette is vertical or nearly vertical. This means that, since the delivering device does not change the angular positions of such oval cigarettes during transfer from the first path to the receiving portion of the second path, the peripheral flutes of the rotary conveyor (i.e., of the conveyor which defines the second path and is normally mounted for rotation about a horizontal axis) necessarily receive successive oval cigarettes in such orientation that the minor axes are vertical, the same as in the first path and during delivery from the first path to the second path. Such mode of introducing oval cigarettes into the peripheral flutes of the rotary drum-shaped conveyor is not the optimum mode because the stability of an oval cigarette in a peripheral flute is much more satisfactory if the minor axis is disposed radially of the normally horizontal axis of the rotary conveyor. Otherwise stated, it is desirable to introduce oval cigarettes into the axially parallel peripheral flutes of a rotary drum-shaped conveyor in such a way that the major axis of the elliptical cross-sectional outline of the cigarette in a flute extends tangentially of the periphery of the conveyor, i.e., at least substantially in a plane which is parallel to the axis of rotation of such conveyor.

OBJECTS OF THE INVENTION

An object of the present invention is to provide a novel and improved apparatus for the transfer of oval cigarettes or analogous commodities from a first path wherein the commodities form a file of coaxial or substantially coaxial commodities (which may but need not be disposed exactly end-to-end) into a second path wherein individual commodities or sets or groups of two or more coaxial commodities are caused to move sideways.

Another object of the invention is to provide an apparatus wherein the commodities (such as oval cigarettes) advancing along the first path are caused to change their angular positions (with respect to their longitudinal axes) in a novel and improved way.

A further object of the invention is to provide a novel and improved guide for lengthwise advancement of a file of successive elongated rod-shaped commodities, particularly plain or filter cigarettes and/or filter mouthpieces, having an elliptical cross-sectional outline.

An additional object of the invention is to provide a novel and improved method of delivering oval cigarettes or similar smokers' products from a maker or from a reservoir to a packing machine or to a filter tipping machine.

Still another object of the invention is to provide a novel and improved combination of a first conveyor which serves to advance cigarettes (particularly oval cigarettes) lengthwise, a second conveyor which serves to advance such cigarettes sideways, and a third conveyor which serves to transfer cigarettes from one to the other of the first and second conveyors.

Another object of the invention is to provide an apparatus which can deliver elongated commodities having oval cross-sectional outlines into the peripheral flutes of a rotary drum-shaped conveyor in such a way tha the minor axes of the outlines extend at least substantially radially of the axis of the drum-shaped conveyor.

A further object of the invention is to provide a novel and improved method of manipulating oval cigarettes on their way between a maker of oval cigarettes and a processing machine, e.g., to a packing machine or a machine wherein plain cigarettes are provided with filter mouthpieces.

An additional object of the invention is to provide a novel and improved device which can deliver oval cigarettes between an elongated path of finite length and an endless path.

Still another object of the invention is to provide a production line which embodies one or more apparatus, devices and/or guides of the above outlined character.

SUMMARY OF THE INVENTION

One feature of the present invention resides in the provision of an apparatus for transferring successive commodities of a file of elongated commodities having an oval cross-sectional outline with a major axis and a minor axis from a first path wherein the commodities are advanced lengthwise and their minor axes are initially at least substantially vertical into a second path wherein the successively transferred commodities move sideways and their minor axes are at least initially at least substantially horizontal. The improved apparatus comprises means for advancing successive commodities of the file along the first path and for simultaneously changing the orientation of the minor axes by x times 90° (wherein x is a whole odd number) so that, upon reaching a predetermined portion of the first path, the minor axes of successive commodities are at least substantially horizontal. The apparatus further comprises means for delivering successive reoriented commodities from the predetermined portion of the first path into a preselected portion of the second path; such delivering means comprises mans for moving the commodities lengthwise with their minor axes remaining at least substantially horizontal.

The commodities are or can constitute rod-shaped products (such as plain cigarettes and/or filter rod sections) of the tobacco processing industry.

At least a portion of (normally the entire) first path is or can be a spiral path.

The first path can be defined by an elongated groove of the advancing means.

The advancing means is or can be configured to leave exposed an upper part of each of the series of commodities reaching the predetermined portion of the first path. The upper part can constitute the upper half of the commodity reaching the predetermined portion of the first path. The moving means can include at least one receptacle arranged to engage from above a commodity in the predetermined portion of the first path. Such moving means can further comprise means for transporting the at least one receptacle along an endless path having a first part at the predetermined portion of the first path and a second part at the preselected portion of the second path. The endless path is or can constitute an at least substantially elliptical path.

The apparatus can further comprise means for conveying commodities along the second path away from the preselected portion, and such conveying means can comprise a conveyor which is rotatable about a predetermined axis and has at least one flute arranged to orbit about the predetermined axis past and to receive commodities at the preselected portion of the second path. The orientation of the at least one flute at the preselected portion of the second path is or can be such that the minor axis of the commodity being received in the at least one flute is at least substantially radial to the predetermined axis.

At least a portion of the first path can be a right-hand or a left-hand spiral path.

Furthermore, at least a portion of the advancing means is or can be twisted about a substantially horizontal axis. Such substantially horizontal axis can coincide with or can be parallel to a longitudinal axis of an elongated commodity in the first path.

Another feature of the instant invention resides in the provision of an advancing device for elongated commodities having an oval cross-sectional outline with a major axis and a minor axis. The advancing device defines a path for advancement of successive commodities of a file of commodities, and the path has a commodity-receiving first portion, a commodity-discharging second portion and an intermediate portion between the first and second portions. The advancing device is further provided with means for changing the orientation of a commodity during advancement along the intermediate portion of the path so that the angular position of the minor axis of the cross-sectional outline of a commodity entering the first portion of the path is changed by x times 90° by the time the commodity reaches the second portion of the path (x is a whole odd number). The minor axis of a commodity entering the first portion of the path is or can be at least substantially vertical. At least a part of the path can constitute a spiral path.

The novel features which are considered as characteristic of the invention are set forth in particular in the appended claims. The improved transferring apparatus itself, however, both as to its construction and the modes of assembling and operating the same, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

FIG. 1 is a somewhat schematic side elevational view of the commodities-advancing and delivering means of an apparatus which is installed at the discharge end of a cigarette rod making machine or another maker of elongated commodities having an oval cross-sectional outline and which embodies one form of the present invention, the commodities having been omitted for the sake of clarity;

FIG. 1a is an enlarged transverse vertical sectional view of a first portion of the advancing means in the apparatus of FIG. 1;

FIG. 1b is a similar enlarged transverse vertical sectional view of a second portion of the advancing means downstream of the first portion as seen in the direction of advancement of commodities toward the delivering means;

FIG. 1c is a similar enlarged transverse vertical sectional view of a third portion of the advancing means downstream of the second portion;

FIG. 1d is a fragmentary vertical sectional view of the delivering means; and

FIG. 2 is a smaller-scale perspective view of the structure which is shown in FIG. 1 and of a rotary drum-shaped conveyor with axially parallel peripheral flutes for reception of reoriented elongated commodities from the delivering means.

DESCRIPTION OF PREFERRED EMBODIMENTS

FIG. 1 shows an advancing unit 2 in the form of an elongated trough serving to guide successive oval cigarettes 1 of a file of such oval cigarettes issuing from a source (e.g., from a maker of oval cigarettes) in the direction indicated by an arrow 5. The oval or elliptical cross-sectional outline of each cigarette 1 has a minor axis 17 and a major axis 18. The longitudinal axes of the oval cigarettes 1 are shown at 3.

A conventional trough-shaped advancing unit, i.e., a predecessor of the novel advancing unit 2, is described for example in British patent No. 1 253 617. The oval cigarettes 1 which enter the novel advancing unit 2 (hereinafter called trough for short) at the right-hand (intake) end can be of unit length or multiple unit length, depending upon whether a delivering unit 4 and a conveyor or conveying unit 11 are to supply oval cigarettes 1 from a predetermined portion A of the first path defined by the trough 2 into a cigarette packing machine (not shown) or into another processing machine, e.g., into a so-called filter tipping machine wherein pairs of oval cigarettes 1 are to be assembled with oval filter mouthpieces (not shown) of double unit length. In a filter tipping machine, axially spaced-apart pairs of oval filter cigarettes (normally of unit length) are assembled with oval filter mouthpieces of double unit length to form oval filter cigarettes of double unit length. Such cigarettes of double unit length are thereupon severed midway across their filter mouthpieces of double unit length to yield pairs of oval filter cigarettes of unit legth which are ready for introduction into storage or directly into a packing machine.

The manner in which oval cigarettes 1 can be or are processed downstream of the conveyor 11 is or can be the same as that of presently treating plain circular or oval cigarettes of unit length or multiple unit length. Reference may be had, for example, to U.S. Pat. No. 4,901,860 granted Feb. 20, 1990 to Wahle et al. for "APPARATUS FOR TESTING AND CLASSIFYING CIGARETTES OR THE LIKE"; this patent fully describes and shows a filter tipping machine. A machine which can supply filter mouthpieces of unit length or multiple unit length, e.g., to the machine disclosed in the Pat. to Wahle et al., is disclosed in U.S. Pat. No. 3,974,007 granted Aug. 10, 1976 to Greve for "METHOD AND APPARATUS FOR THE PRODUCTION OF FILTER ROD SECTIONS OR THE LIKE". A packing machine which can confine arrays (e.g., so-called quincunx formations) of oval or circular plain or filter cigarettes in so-called soft packets or hinged lid packets is distributed by Topack Verpackungstechnik GmbH, Schwarzenbek, Federal Republic Germany, and is known as COMPAS.

Commonly owned U.S. Pat. No. 5,632,285 (granted May 27, 1997 to Dahlgrün for "APPARATUS FOR MAKING FILTER TIPPED SMOKERS' PRODUCTS HAVING A NON-CIRCULAR CROSS-SECTIONAL OUTLINE") discloses apparatus for making oval filter cigarettes; such cigarettes can be fed into the groove 2a of the trough 2 to be treated in accordance with the present invention.

In accordance with a feature of the present invention, the trough 2 is designed in such a way that it changes the anglar positions of successive oval cigarettes of unit length (as shown) or multiple unit length with reference to their longitudinal axes 3 through angles of 90°, 270°, 450°, 630°, etc., i.e., through x times 90° wherein x is a whole odd number (i.e., 1, 3, 5, 7, etc.).

When a freshly produced oval cigarette 1 enters the elongated groove 2a of the trough 2, the minor axis 17 of its oval cross-sectional outline is vertical (see FIG. 1a) and the major axis 18 is located at or close to the level of the upper side of the corresponding portion of the trough 2. The elongated groove 2a of the trough 2 receives the lower half of the commodity (oval cigarette and hereinafter called cigarette or oval cigarette) 1 which is caused to advance toward a predetermined portion A of the horizontal path for successive oval cigarettes. The means for causing the file of serially produced or serially delivered oval cigarettes 1 to advance from the maker or from a reservoir to the portion A of the horizontal path defined by the groove 2a is not shown; for example, the cigarettes 1 can be pushed by the next-following cigarettes and/or they can be advanced pneumatically or mechanically in a manner well known from the art of making and transporting cigarettes lengthwise.

In accordance with a feature of the invention, and as shown in FIGS. 1b and 1c, the configuration of the trough 2 is such that the orientation of each oval cigarette 1 advancing from the inlet of the path defined by the groove 2a to the predetermined portion (outlet) A of the path is changed in a manner as already pointed out above, namely by 90° or by a whole multiple x of 90°, i.e., 3×90°, 5×90°, 7×90°, etc. This expedient ensures that, upon arrival at the outlet A, the orientation of the oval cigarette 1 with reference to its longitudinal axis 3 is such that the major axis of its oval cross-sectional outline is vertical (see FIG. 1c which is a vertical cross section taken at the predetermined portion or outlet A of the groove 2a). In FIGS. 1, 1a, 1b and 1c, the configuration of the groove 2a is such that it changes the orientation of the minor axis 17 (and hence also of the major axis 18) of the oval cross-sectional outline of each cigarette 1 by 90°.

In FIG. 1b, the extent of change of orientation of the axes 17, 18 of each oval cigarette 1 is about 45°, and the extent of such change is 90° at the predetermined portion or outlet A of the horizontal path (see FIG. 1c). Changes in orientation of successive cigarettes 1 are achieved by imparting to the groove 2a the shape of a left-hand or right-hand spiral. All that counts is to ensure that an oval cigarette 1 leaving the maker at the right-hand end of the trough 2 in an orientation such that the minor axis 17 of the oval cross-sectional outline is vertical (FIGS. 1a and 2) reaches the outlet A in an orientation in which the minor axis 17 is horizontal (see FIGS. 1c and 2).

The delivering unit 4 is designed and operates in such a way that the orientation of the minor axis 17 and of the major axis 18 of the oval cross-sectional outline of a cigarette remains unchanged while the cigarette is being delivered (by the unit 4) from the portion A of the horizontal path defined by the groove 2a of the trough 2 to the preselected portion B of a second path defined by the axially parallel peripheral flutes 16 of a rotary horizontal drum-shaped conveyor 11 (FIG. 2). The latter is driven to rotate in a counterclockwise direction as indicated by the arrow 15. The horizontal axis of the conveyor 11 is shown at 14, the cylindrical body of this conveyor is shown at 12, and the character 13 denotes a shaft which drives the conveyor 11 counterclockwise (arrow 15) as viewed in FIG. 2.

The delivering unit 4 is or can be similar or practically identical to that disclosed in U.S. Pat. No. 4,051,947 granted Oct. 4, 1977 to Schumacher et al. for "TRANSFER APPARATUS FOR CIGARETTES OR THE LIKE". The purpose of the unit 4 is to ensure that the orientation of the axes 17 and 18 remains unchanged during transport of successive oval cigarettes from the predetermined portion (outlet) A of the first path defined by the spiral groove 2a of the trough 2 to the preselected portion B of the second path defined by the axially parallel peripheral flutes 16 of the drum-shaped rotary conveyor 11. This can be readily seen by comparing the orientation of the oval cigarettes 1 shown in FIGS. 1c and 1d, i.e., the orientations of the minor and major axes 17, 18 of the oval cross-sectional outlines of these cigarettes are the same.

An advantage of the just outlined mode of operation of the delivering unit 4 is that the major axis 18 of the cross-sectional outline of an oval cigarette 1 entering the oncoming flute 16 of the conveyor 11 extends at right angles to the axis 14. This ensures that the minor axis 17 extends at least substantially radially of the axis 14.

The delivering unit 4 has a set of receptacles 6 movably mounted on a rotary support 7 by way of discrete arms 8. The support 7 is driven to rotate clockwise (as indicated by the arrow 10) so that the upper half of the oval cigarette 1 arriving at the predetermined portion A of the horizontal first path is compelled to enter the oncoming receptacle 6 from below. Thus, the manner in which the arms 8 are compelled to turn relative to the support 7, while the latter turns in the direction indicated by the arrow 10, is such that the major axes 18 of the oval cross-sectional outlines of the cigarettes 1 advancing from the predetermined portion or outlet A of the horizontal first path to the preselected portion B of the second path defined by the flutes 16 remain vertical. Consequently, each cigarette 1 enters the oncoming flute 16 in such a way that the minor axis of its oval cross-sectional outline extends radially of the axis 14 of the rotary drum-shaped conveyor 11.

The transfer of cigarettes 1 from the groove 2a into the undersides of receptacles 6 of the delivering unit 4 takes place at the lowermost portion (A) of the oval path for the receptacles 6. Thus, a receptacle 6 which has received a cigarette 1 begins to move from a lower level (at A) toward a higher level (at B) and remains horizontal between A and B as well as during travel along each portion of its oval path which connects the portion A of the horizontal first path (in the groove 2a) with the portion B of the circular second path (defined by the flutes 16).

The speed of a receptacle 6 reaching the predetermined portion A of the horizontal first path in the direction (arrow 5) of advancement of successive oval cigarettes 1 at the discharge end of the groove 2a matches the speed of the cigarette so that the transfer from the trough 2 into the oncoming receptacle 6 of the delivering unit 4 takes place without any damage to (such as distortion of) the cigarettes 1 on their way from the groove 2a into the oncoming (descending) receptacles 6. The situation is analogous during transfer of oval cigarettes 1 from the receptacles 6 into the flutes 16 of the rotary drum-shaped conveyor 11.

The distance between the portions A and B of the first and second paths for successive oval cigarettes 1 equals or approximates 25% of the oval path for the receptacles 6.

Each receptacle 6 attracts the respective oncoming oval cigarette 1 (in the orientation as shown in FIGS. 1c ad 1d) by suction; however, communication between the suction port(s) of a receptacle 6 and a suction generating device (e.g., a suction pump, not shown) is interrupted in the portion B of the second path so that the conveyor 11 can attract the cigarette 1 at the path portion B by suction and advances the thus accepted and attracted oval cigarette to the location where the cigarettes 1 leave the conveyor 11 to advance toward a processing station, e.g., to a packing machine for oval cigarettes. The conveyor 11 can constitute a component part of a packing machine or a component part of a filter tipping machine wherein the oval cigarettes are united with oval filter mouthpieces of unit length or multiple unit length to form therewith oval filter cigarettes of unit length or multiple unit length. The manner in which an oval or circular cigarette can be connected with an oval or circular (cylindrical) mouthpiece (normally by means of a so-called (adhesive-coated) uniting band is well known in the filter cigarette making art. Reference may also be had to the aforementioned U.S. Pat. No. 4,901,860 to Wahle et al. and/or to the aforementioned U.S. Pat. No. 5,632,285 to Dahlgrün.

An important advantage of the improved apparatus is that, if a maker turns out oval cigarettes 1 in such a way that the minor axes 17 of the oval cross-sectional outlines of the cigarettes are vertical (FIG. 1a), the receptacles 6 receive the cigarettes in an orientation such (FIG. 1c) that the minor axes are horizontal. Since the orientation of oval cigarettes during travel (from A to B) with the receptacles 6 remains unchanged, and since the receptacles 6 deliver the cigarettes 1 to the oncoming flutes 16 at the three o'clock positions of the respective flutes, the minor axis 17 of a cigarette 1 in its flute 16 extends radially of the axis 14. This enables the conveyor 11 to advance successive cigarettes 1 from the path portion B to the point of transfer of cigarettes from the conveyor 11 with a much higher degree of reliability and predictability than if the major axis 18 were to extend radially of the axis 14 of the rotary conveyor 11.

The above outlined advantages are achieved by the simple expedient of imparting to the groove 2a the shape of a right-hand or left-hand spiral wherein the orientation of each oval cigarette 1 is changed by x times 90° (x being a whole odd number including 1, 3, 5, etc.). Otherwise stated, the spiral groove 2a causes each oval cigarette 1 to change its orientation in such a way that the left-hand half or the right-hand half 1a of a cigarette entering the groove 2a becomes the upper or the lower half upon arrival at the predetermined portion A of the first path. Therefore, each receptacle 6 confines a portion 1a (i.e., a portion including one-half of the major axis 18) rather than a portion including one-half of the minor axis 17. Thus, the minor axis 17 does not enter the receptacle 6.

The decision to provide the trough 2 with a groove 2a which is a left-hand or a right-hand spiral will determine whether the customary longitudinally extending seam between the overlying marginal portions of the tubular wrapper of an oval cigarette 1 will face outwardly or inwardly upon entry of the cigarette into the peripheral flute 16 of the rotary drum-shaped conveyor 11. The exact location of the seam can be of importance when a plain oval cigarette is to be connected with an oval filter mouthpiece to form therewith a filter cigarette. The orientation of the seam can influence the quality of the seal which is established by an adhesive-coated uniting band being utilized to connect one end portion of a plain oval cigarette with the adjacent oval filter mouthpiece.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of manipulating elongated commodities having oval cross-sectional outlines and, therefore, such adaptations should and are intended to be comprehended within the meaning and range of equivalence of the appended claims.

What is claimed is:

1. Apparatus for transferring successive commodities of a file of elongated commodities having an oval cross-sectional outline with a major axis and a minor axis from a first path wherein the commodities are advanced lengthwise and their minor axes are initially at least substantially vertical into a second path wherein the successively transferred commodities move sideways and their minor axes are at least initially at least substantially horizontal, comprising:

means for advancing successive commodities of the file along the first path and for simultaneously changing the orientation of the minor axes by x times 90°, wherein x is a whole odd number so that, upon reaching a predetermined portion of said first path, the minor axes of successive commodities are at least substantially horizontal; and means for delivering successive reoriented commodities from said predetermined portion of said first path into a preselected portion of said second path, including means for moving the commodities lengthwise with their minor axes remaining at least substantially horizontal.

2. The apparatus of claim 1, wherein the commodities are rod-shaped products of the tobacco processing industry.

3. The apparatus of claim 1, wherein at least a portion of said first path is a spiral path.

4. The apparatus of claim 3, wherein the entire first path is a spiral path.

5. The apparatus of claim 1, wherein said first path is defined by an elongated groove of said advancing means.

6. The apparatus of claim 1, wherein said advancing means is configured to leave exposed an upper part of each of said series of commodities reaching said predetermined portion of said first path.

7. The apparatus of claim 6, wherein said upper part is an upper half of the commodity reaching said predetermined portion of said first path.

8. The apparatus of claim 6, wherein said moving means includes at least one receptacle arranged to engage from above a commodity in said predetermined portion of said first path.

9. The apparatus of claim 8, wherein said moving means further comprises means for transporting said at least one receptacle along an endless path having a first part at said predetermined portion of said first path and a second part at said preselected portion of said second path.

10. The apparatus of claim 8, wherein said endless path is an at least substantially elliptical path.

11. The apparatus of claim 1, further comprising means for conveying commodities along said second path away from said preselected portion, including a conveyor rotatable about a predetermined axis and having at least one flute arranged to orbit about said axis past and to receive commodities at said preselected portion of said second path.

12. The apparatus of claim 11, wherein the orientation of said at least one flute at said preselected portion of said second path is such that the minor axis of the commodity being received in said at least one flute is at least substantially radial to said axis.

13. The apparatus of claim 1, wherein at least a portion of said first path is one of (a) a right-hand and (b) a left-hand spiral path.

14. The apparatus of claim 1, wherein at least a portion of said advancing means is twisted about a substantially horizontal axis.

15. The apparatus of claim 14, wherein said substantially horizontal axis coincides with a longitudinal axis of an elongated commodity in said first path.

16. The apparatus of claim 14, wherein said substantially horizontal axis is parallel to a longitudinal axis of an elongated commodity in said first path.

17. As a novel article of manufacture, an advancing device for elongated commodities having an oval cross-sectional outline with a major axis and a minor axis, said device defining a path for advancement of successive commodities of a file of commodities, said path having a commodity-receiving first portion, a commodity-discharging second portion and an intermediate portion between said first and second portions, said device further having means for changing the orientation of a commodity during advancement alog said intermediate portion of said path so that the angular position of the minor axis of the cross-sectional outline of a commodity entering said first portion is changed by x times 90° by the time the commodity reaches said second portion of said path, x being a whole odd number.

18. The advancing device of claim 17, wherein the minor axis of a commodity entering said first portion of said path is at least substantially vertical.

19. The advancing device of claim 17, wherein at least a part of said path is a spiral path.

* * * * *